US008849622B2

(12) United States Patent
Melkumyan et al.

(10) Patent No.: US 8,849,622 B2
(45) Date of Patent: Sep. 30, 2014

(54) METHOD AND SYSTEM OF DATA MODELLING

(75) Inventors: Arman Melkumyan, Lane Cove (AU); Fabio Tozeto Ramos, Alexandria (AU)

(73) Assignee: The University of Sydney, The University of Sydney, New South Wales (AU)

( * ) Notice: Subject to any disclaimer, the term of this patent is extended or adjusted under 35 U.S.C. 154(b) by 549 days.

(21) Appl. No.: 12/650,444

(22) Filed: Dec. 30, 2009

(65) Prior Publication Data

US 2010/0174514 A1    Jul. 8, 2010

(30) Foreign Application Priority Data

Jan. 7, 2009   (AU) ................................. 2009900054

(51) Int. Cl.
*G06F 17/10* (2006.01)
*G06F 7/60* (2006.01)
*G06F 17/18* (2006.01)

(52) U.S. Cl.
CPC ..................................... *G06F 17/18* (2013.01)
USPC ............................................................ 703/2

(58) Field of Classification Search
CPC ............ G06F 17/18; G06N 3/02; G06N 3/04; G06N 3/08; G06N 3/004; G06N 3/063; G06N 99/005; G06K 9/6256
USPC .......................... 703/2; 706/12, 14, 15, 25, 44
See application file for complete search history.

(56) References Cited

U.S. PATENT DOCUMENTS

| 5,713,016 | A | 1/1998 | Hill |
| 6,487,322 | B1 | 11/2002 | Bastos et al. |
| 7,574,019 | B2* | 8/2009 | Mittal et al. ................... 382/103 |
| 8,046,200 | B2* | 10/2011 | Kirby et al. ........................ 703/2 |
| 2008/0215298 | A1 | 9/2008 | Haney et al. |
| 2009/0164405 | A1* | 6/2009 | Yang et al. ....................... 706/46 |

FOREIGN PATENT DOCUMENTS

| WO | WO 2008/001105 A1 | 1/2008 |
| WO | WO 2008/133509 A1 | 11/2008 |

OTHER PUBLICATIONS

Melkumyan et al. (A Sparse covariance Function for exact Gaussian process inference in large data set, Jun. 2009).*
Rasmussen et al. (Gaussian Processes for Machine Learning, pp. 1-266, 2006).*
Jorge Nocedal and Stephen J. Wright, "Numerical Optimization," Springer Series in Operations Research, Second Edition, pgs, Cover page, Copyright page, Table of Contents, vii-xvi, 1-9, 30-65, 135-192, and 529-562 (2000).

(Continued)

*Primary Examiner* — Kamini S Shah
*Assistant Examiner* — Andre Pierre Louis
(74) *Attorney, Agent, or Firm* — Blakely, Sokoloff, Taylor & Zafman LLP (57) ABSTRACT

A system for large scale data modelling is described. The system includes at least one data measurement sensor (230) for generating measured data, a training processor (240) to determine optimized hyperparameter values in relation to a Gaussian process covariance function including a sparse covariance function that is smooth and diminishes to zero outside of a characteristic hyperparameter length. An evaluation processor (260) determines model data from the Gaussian process covariance function with optimised hyperparameter values and measured data. Also described is methods for modelling date, including a method using a Gaussian process including a sparse covariance function that diminishes to zero outside of a characteristic length, wherein the characteristic length is determined from the data to be modelled.

25 Claims, 9 Drawing Sheets

(56) References Cited

OTHER PUBLICATIONS

C.E. Rasmussen, et al., "Gaussian Processes for Machine Learning," Chapter 4: Covariance Functions, pp. 79-104 (2006).

Tobias Lang, et al., "Adaptive Non-Stationary Kernel Regression for Terrain Modeling," Proceedings of Robotics Science and Systems (RSS). 8 pgs. (Jun. 2007).

I.M. Glacken et al., "Mineral Resource Estimation, in Mineral Resource and Ore Reserve Estimation—The AusIMM Guide to Good Practice (Ed: A. C. Edwards)," The Australasian Institute of Mining and Metallurgy: Melbourne, pp. 189-198 (2001).

Lehel Csato et al., "Sparse Representation for Gaussian Process Models," Advances in Neural Information Processing Systems, 7 pgs. (2001).

Matthias Seeger, "Gaussian Processes for Machine Learning," International Journal of Neural Systems, vol. 14, 52 pgs, (Feb. 24, 2004).

Michael E. Tipping, "Sparse Kernel Principal Component Analysis," Proceedings of Neural Information Processing System, 7 pgs. (2000).

International Search Report for Australian Counterpart Application No. 2009900054, 2 pgs (Sep. 30, 2009).

\* cited by examiner

Comparison of GP regression with covariance functions $k_M$ and $k_{NN'}$

FIGURE 7

Comparison of GP regression with covariance functions $k_M$ and $k_{NN'}$ (continuation)

METHOD AND SYSTEM OF DATA MODELLING

FIELD OF THE INVENTION

This invention relates to the field of large scale data modelling. Examples of its application include, but are not limited to spatial data modelling such as, in-ground ore grade estimation for mining and terrain modelling for robotic vehicle navigation.

BACKGROUND OF THE INVENTION

Gaussian Process regression models are used to determine functions that model known data. The known data can be, for example, discrete elevation measurements over a certain area. The model would then provide a means of inferring values for intermediate points that were not measured, called test points.

In a large scale environment like an open-cut mine spatial modelling of geography and geology can have many uses in planning, analysis and operations within the environment. In the case of automated mining, a geographical model or terrain map can be used to guide robotic vehicles, whilst an in-ground geological model of the ore body may be used to determine drilling and blasting operations.

A digital representation of the operating environment in the form of a spatial model is typically generated from sensor measurements which provide a sample of the actual environmental variable being modelled (e.g. elevation in the case of a terrain map, or ore grade in the case of in-ground ore body modelling) at various spatially distinct locations within the operating environment. The measured sample data is then treated in some manner such as by interpolation to determine information about the environment in locations other than those actually measured. Some of the challenges posed by this task include dealing with the issues of uncertainty, incompleteness and handling potentially large measurement data sets.

Gaussian Processes (GPs) are stochastic processes based on the normal (Gaussian) distribution and can be used to good effect as a powerful nonparametric learning technique for modelling. Inference of continuous values with a Gaussian process prior is known as Gaussian process regression, and is sometimes referred to as "Kriging".

Whilst Gaussian processes are a useful and powerful tool for regression in supervised machine learning they are regarded as a computationally expensive technique, which is particularly disadvantageous in the treatment of large measurement data sets. The computational expense is primarily brought on by the need to invert a large covariance matrix during the inference procedure. For problems with thousands of observations, exact inference in normal Gaussian processes is intractable and approximation algorithms are required.

SUMMARY OF THE INVENTION

In one embodiment the invention provides a method for modelling data using a Gaussian process including a sparse covariance function that diminishes to zero outside of a characteristic length, wherein the characteristic length is determined from the data to be modelled.

In one embodiment the sparse covariance function is smooth. In another embodiment the sparse covariance function has a continuous fourth derivative. In another embodiment the characteristic length is determined through a machine learning process. In another embodiment the sparse covariance function is multi-dimensional with a separate characteristic length for each dimension. In another embodiment the Gaussian process further includes a non-stationary covariance function. In another embodiment the non-stationary covariance function is a neural network covariance function. In another embodiment the sparse covariance function and non-stationary covariance function are combined in Gaussian process regression computations. In another embodiment the data is measured using one or more measurement sensors. In another embodiment the data represents geographical surface terrain. In another embodiment the data represents in-ground geological mineral distribution.

In one embodiment the invention provides a method for modelling large scale data representing a distribution of physical properties, including obtaining a measured dataset, applying an exactly sparse Gaussian process covariance function to the measured dataset to determine an optimized set of hyperparameter values associated with the Gaussian process covariance function, and generating selected model data by Gaussian process regression using the optimized hyperparameter set and the measured dataset.

In one embodiment the exactly sparse Gaussian process covariance function includes a sparse covariance function that is smooth and diminishes to zero outside of a characteristic hyperparameter length, and a non-stationary neural network covariance function.

In another embodiment the sparse covariance function is multi-dimensional with a separate characteristic hyperparameter length for each dimension. In another embodiment the measured dataset represents geographical surface terrain measurements. In another embodiment the measured dataset represents in-ground geological mineral distribution measurements.

In one embodiment the invention provides a system for large scale data modelling, including at least one data measurement sensor for generating measured data representing a distribution of physical properties in a selected geographical region; a training processor adapted to determine for the measured data optimized hyperparameter values in relation to a Gaussian process covariance function including a sparse covariance function that is smooth and diminishes to zero outside of a characteristic hyperparameter length; and an evaluation processor adapted to determine model data from the Gaussian process covariance function with optimised hyperparameter values and measured data.

In one embodiment the Gaussian process covariance function also includes a non-stationary neural network covariance function. In another embodiment the measured data comprises geographical surface terrain measurements. In another embodiment the measured data comprises in-ground ore grade distribution measurements.

In another embodiment the invention provides a computational method for modelling a data space, the method including using a computational system, applying to the data space a kernel machine, wherein the kernel machine uses a covariance function which is constructed from a smooth basis function equal to zero outside of a defined interval; one of outputting and storing in memory a model from the kernel machine.

In another embodiment the kernel machine uses a Gaussian learning process. In another embodiment the basis function is a squared cosine wave. In another embodiment the basis function is $\cos^2(\pi x) H(0.5 - |x|)$ where $H(.)$ is a step function.

In another embodiment the multi-dimensional data space has N dimensions and the covariance function is $$K_1(x, x'; l, \sigma_0) = \begin{cases} \sigma_0 \left[ \dfrac{2 + \cos\left(2\pi\dfrac{d}{l}\right)}{3}\left(1 - \dfrac{d}{l}\right) + \dfrac{1}{2\pi}\sin\left(2\pi\dfrac{d}{l}\right) \right] & \text{if } d < l \\ 0 & \text{if } d \geq l, \end{cases}$$

$$d = |x - x'|,$$

extended to multiple dimensions.

In another embodiment the defined interval is a hyperparameter.

In another embodiment the invention provides a method for modelling a data space, the method including using a computational system, applying to the data space a kernel machine, wherein the kernel of the kernel machine is a positive semi-definite function and a symmetric function, equal to zero outside of a defined interval, and at least one of one of outputting and storing in memory a model from the Gaussian regression process.

BRIEF DESCRIPTION OF THE DRAWINGS

The invention will be more fully understood through the following description of an embodiment thereof together with the illustrations in the accompanying drawings in which.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

The present invention may be applied to digital terrain modelling as described hereinbelow in a non-limiting example of its implementation.

1. System Overview

Figure 1:
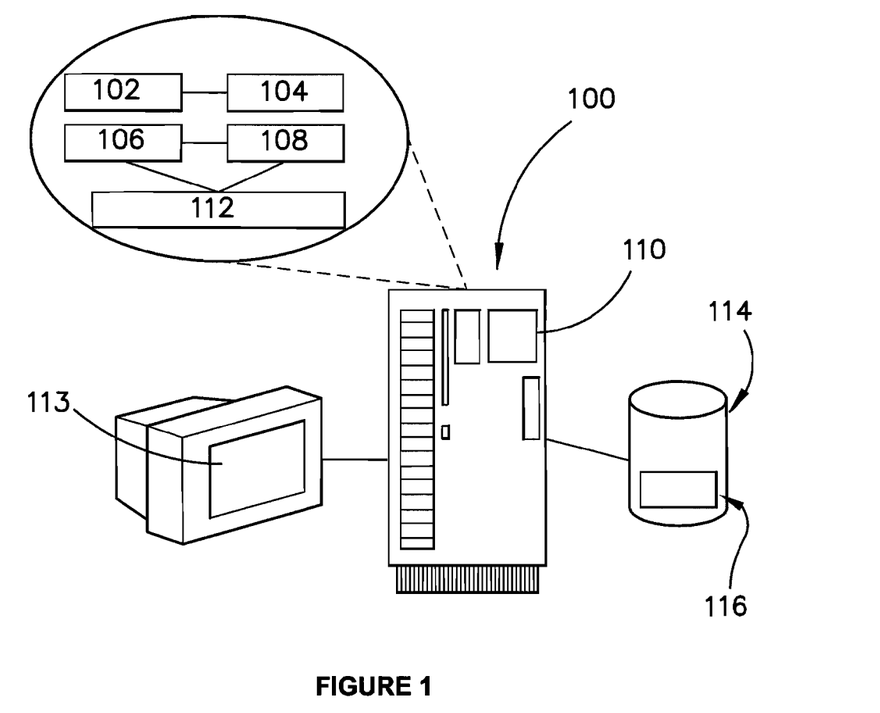
FIG. 1 is an example computing system utilisable to implement a terrain modelling system in accordance with an embodiment of the invention.

Referring to FIG. 1, an embodiment of a terrain modelling system is implemented with the aid of appropriate computer hardware and software in the form of a computing system 100. The computing system 100 comprises suitable components necessary to receive, store and execute appropriate computer instructions. The components may include a processing unit 102, read only memory (ROM) 104, random access memory (RAM) 106, an input/output device such as disk drives 108, communication links 110 such an Ethernet port, a USB port, etc. and a display 113 such as a video display or any other suitable display. The computing system 100 includes instructions that may be included in ROM 104, RAM 106 or disk drives 108 and may be executed by the processing unit 102. There may be provided a plurality of communication links 110 which may variously connect to one or more computing devices such as a server, personal computers, terminals, wireless handheld computing devices or other devices capable of receiving and/or sending electronic information. At least one of a plurality of communications links may be connected to an external computing network through a telephone line, an Ethernet connection, or any type of communications link. Additional information may be entered into the computing system by way of other suitable input devices such as, but not limited to, a keyboard and/or mouse (not shown).

The computing system may include storage devices such as a disk drive 108 which may encompass solid state drives, hard disk drives, optical drives or magnetic tape drives. The computing system 100 may use a single disk drive or multiple disk drives. A suitable operating system 112 resides on the disk drive or in the ROM of the computing system 100 and cooperates with the hardware to provide an environment in which software applications can be executed.

In particular, the data storage system is arranged to store measurement data received from the sensors, in a suitable database structure 114. The data storage system also includes a terrain model 116, which is utilised with the measurement data to provide a 2.5D "map" of the terrain. The data storage system may be integral with the computing system, or it may be a physically separate system.

In more detail, the data storage system is loaded with a modelling module including various sub-modules (not shown). The sub-modules are arranged to interact with the hardware of the computing system 100, via the operating system 116, to either receive the data collected by the measurement sensors (generally sent via the communications links 114) and/or process the received data to provide the measured data. In some embodiments, there may be provided a visual display unit, which may be in either local or remote communication with the computing system 100, and is arranged to display information relating to the programs being run thereon. In other embodiments, the data may be used directly by an autonomous robot (e.g. an automated vehicle) to perform particular tasks, such as navigation of the terrain.

Figure 2:
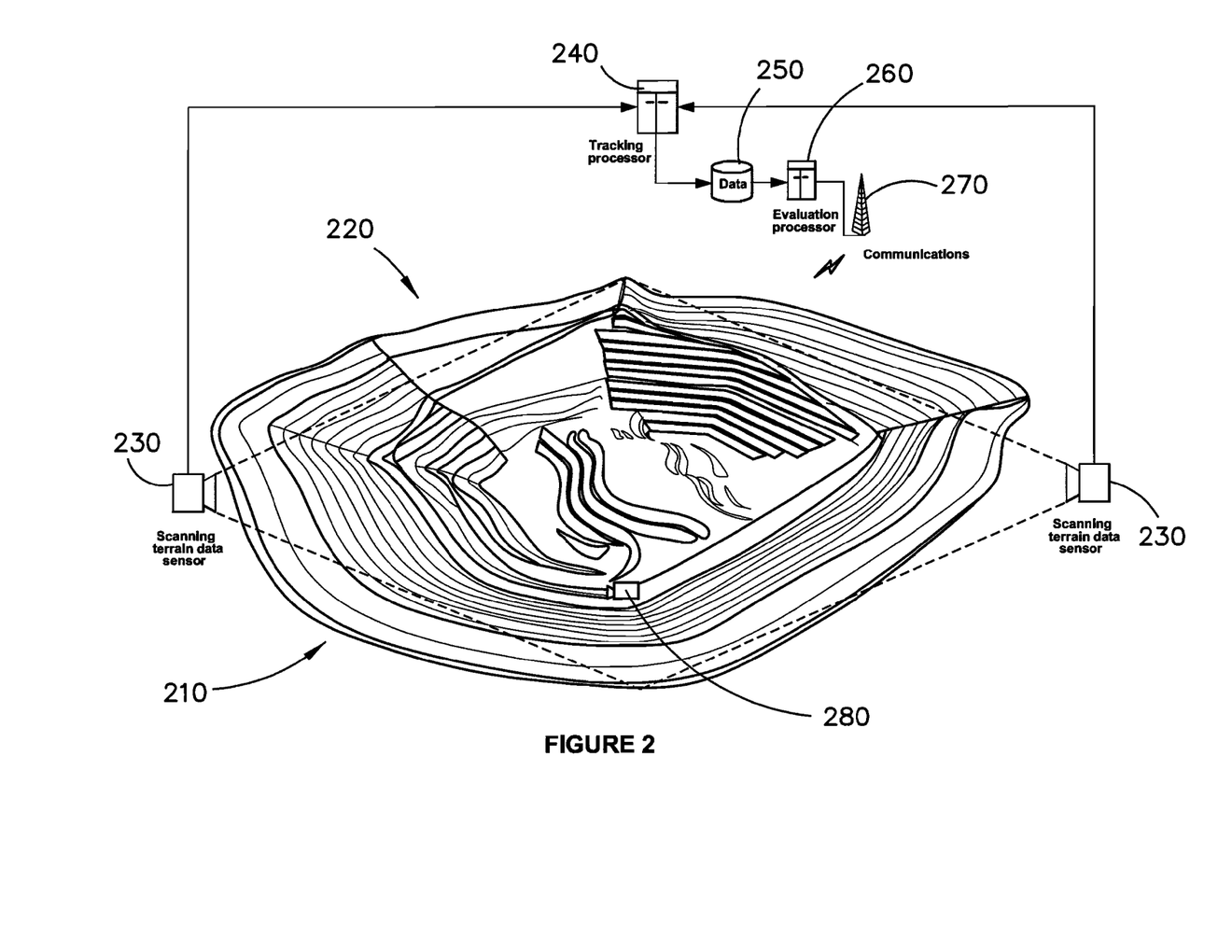
FIG. 2 is a diagrammatic illustration of a terrain region and a system adapted for generating and maintaining a corresponding digital terrain model for use in controlling autonomous vehicles.

FIG. 2 is a diagrammatic illustration of a terrain region and a system adapted for generating and maintaining a corresponding digital terrain model for use in controlling autonomous vehicles. The terrain modelling system 210 operates on a terrain region 220 in the form of an open pit mine, and utilises one or more measurement sensors 230 to provide measured terrain data about the region 220. The sensor 230 provides spatial data measured from the terrain region 220 which can be generated by a number of different methods, including laser scanning, radar scanning, GPS or manual survey. One example of an appropriate measurement sensor is the LMS Z420 time-of-flight laser scanner available from Riegl. This form of sensor can be used to scan the environment region and generate a 3D point cloud comprising (x, y, z) data in three frames of reference. In the system 210 illustrated, two separate scanners are shown disposed to opposite sides of the terrain to be modelled so as to minimise occlusions and the like.

Figure 3:
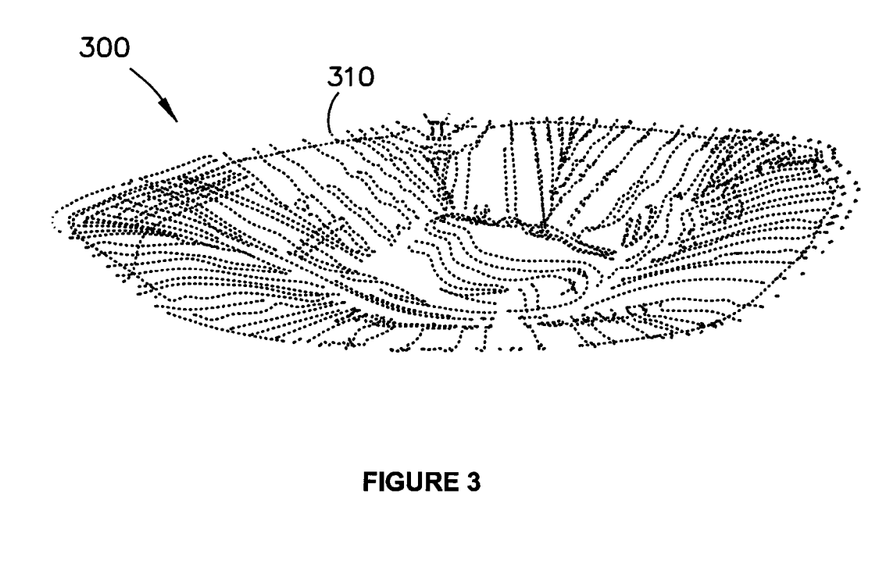
FIG. 3 is a diagrammatic illustration of sensor sample data points representing elevation information across the terrain region of FIG. 2.

The sampled spatial data compiled from the sensors is illustrated diagrammatically in FIG. 3, which shows a distribution 300 of individual sample data points 310 collected from across the terrain region representing the surface elevation at various locations. In order to build a terrain model the collection of sample data points are used as described below in a computational system involving Gaussian processes to enable the surface elevation to be inferred at any location in the terrain region.

The measurement sensor data generated by the sensors 230 is provided to a training processor 240 coupled to data storage 250. The training processor 240 is adapted to organise the sensor data and determine a non-parametric, probabilistic, multi-scale representation of the data for use in terrain modelling, which is stored in the data storage 250. Details of the specific operational procedures carried out by the training processor are described below with reference to FIG. 4.

An evaluation processor 260 is also coupled to access the data storage 250 and is adapted to utilise the data from the data storage 250 and terrain model data according to a desired modelling grid resolution. Specific operational details of the evaluation processor are provided below with reference to FIG. 5. Once the terrain model data has been generated it can be communicated to an autonomous robotic vehicle 280, operating within the modelled environment, by a suitable communications medium 270, such as a radio communication link.

Figure 4:
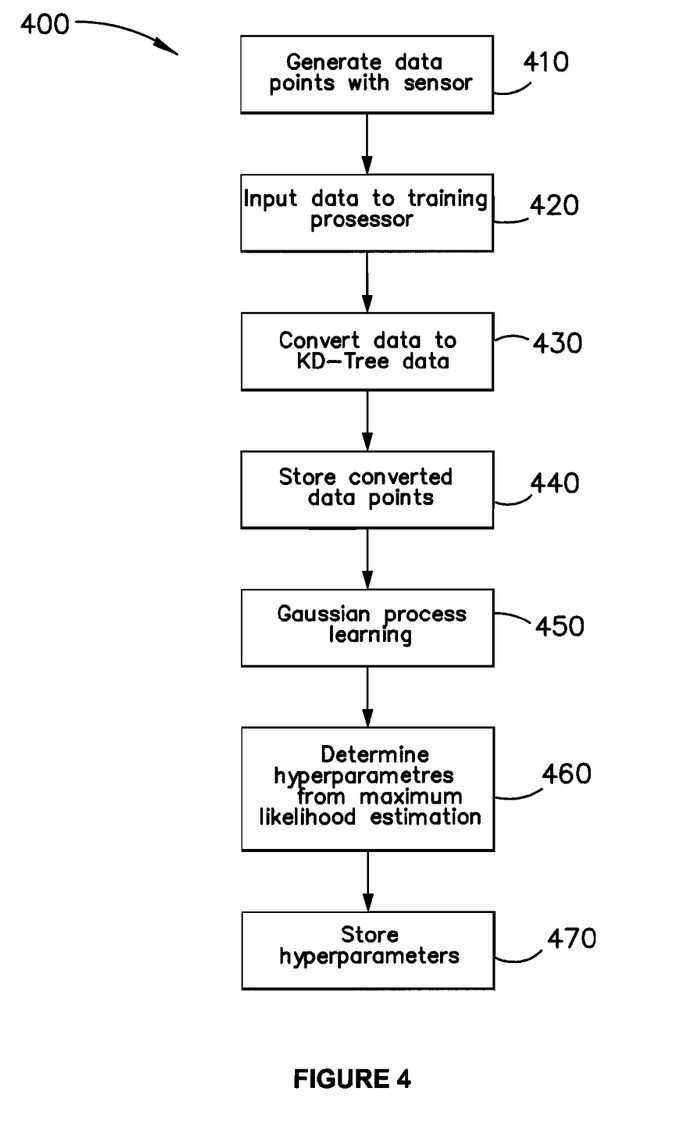
FIG. 4 is a flow-chart diagram showing a training phase for a terrain data modelling process.

FIG. 4 is a flow-chart diagram showing a training phase procedure 400 for the terrain data modelling process. The procedure 400 that begins with obtaining sensor measurement data at step 410 from an appropriate source, in this case a Riegl LMS Z420 3D laser scanner. The laser scanner mentioned generates in the order of two-million data points for a given scan. Previously known Gaussian processes would typically require such a dataset to be reduced in magnitude in order to reduce the computational complexity and data storage requirements. In other words, a prior art Gaussian process may discard most of the measured data to reduce the number of data points to be used for actually generating the terrain model. By way of example, known Gaussian processes may necessitate the sensor measurement dataset being reduced from millions of data points down to thousands of data points. However, a Gaussian process employing a modified covariance function is described below which allows all of the measured data to be incorporated into the model without arbitrary sampling reduction. This process is thus well-suited for modelling large scale data, and particularly advantageous where the number of data points exceeds approximately 5000.

For ease of storage and retrieval the data storage 250 can make use of an efficient, hierarchical data structure known as a KD-Tree. The use of such a data structure provides the training and evaluation processors with rapid access to the sampled measurement data on demand. After the data has been input to the training processor 420 it is converted to KD-Tree data 430 and stored 440.

The data storage step is followed by a Gaussian process learning procedure at step 450, with the objective of learning a representation of the spatial data. Details of the Gaussian process learning procedure are provided below. This method provides for a non-parametric, probabilistic, multi-scale representation of the data. No explicit assumption of the underlying functional model is made.

Hyperparameters are determined from the data to be modelled. The hyperparameters can be learnt from the measured data using a manual process, i.e. using a trial and error process. The hyperparameters can also be learnt using a machine learning process. Typical methods include using leave-one-out cross-validation (LOOCV), also called rotation estimation, and Bayesian learning such as Maximum Likelihood Estimation.

In this example, a Maximum Likelihood Estimation method is used.

There are also various methods that can be used to optimise the hyperparameters. These include Broyden-Fletcher-Goldfarb-Shanno (BFGS) gradient descent and simulated annealing. In the example described in this specification, a combination of these two methods is used.

The covariance function hyperparameters provide a coarse description of the terrain model, and can be used together with the sensor measurement data to generate detailed terrain model data at any desired resolution, including a statistically sound uncertainty estimate. The optimized covariance function hyperparameters are stored 470, together with the KD-Tree sample data structure, for use by the evaluation procedure.

The hyperparameters determined for this example application are: $\sigma_0$, a scaling factor, $\sigma_n$, a noise component, and l, the characteristic length, which describes the distance over which points are correlated in a certain neighbourhood.

It is also possible to obtain an estimate of the hyperparameters without using machine learning. It can be done through an iterative manual estimation process, for example.

Figure 5:
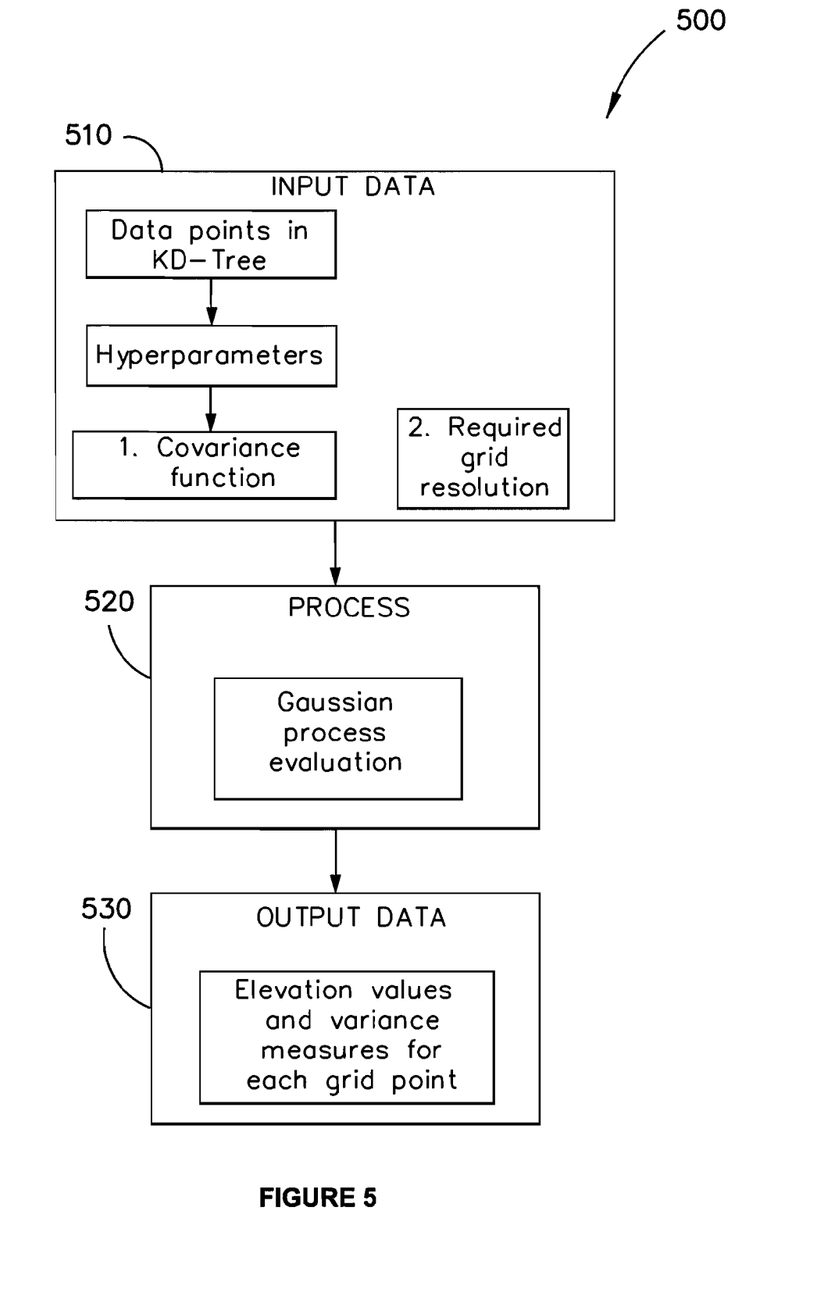
FIG. 5 is a diagrammatic representation of the evaluation phase for the terrain data modelling process.

FIG. 5 is a diagrammatic representation of the evaluation phase procedure 500 for the terrain data modelling process. The sensor measurement spatial data stored in the KD-Tree and the Gaussian process model hyperparameters obtained in the learning phase are used here as the input data to the GP evaluation process 520. Since the Gaussian process representation obtained is a continuous domain one, applying the model for any desired resolution amounts to sampling the model at that resolution, as the data required for the grid resolution (in 510) can be obtained as outlined below.

A grid in the area of interest, at the desired resolution is formed. The objective is to use the learnt spatial model to estimate the elevation at individual points in this grid. Each point in the grid is interpolated with respect to the model learnt in the previous step and the nearest training data around that point. For this step, the KD-Tree naturally and efficiently provides access to the nearest known data. This together with the learnt model provides an interpolation estimate for the desired location in the grid. The estimate is also accompanied with an uncertainty measure that is simultaneously computed in a statistically sound manner. Details of the Gaussian process evaluation and computational procedures are provided below. It is a benefit of the covariance function used with the Gaussian Process as described below that the data neighbourhood can be determined from the data relatively quickly. It is also possible to know with an increased certainty that the impact of the data points outside the neighbourhood is zero. This neighbourhood of relevant points is shown in the KD-Tree structure.

The output 530 of the Gaussian process evaluation 520 is a digital elevation map/grid at the chosen resolution and region of interest together with an appropriate measure of uncertainty for every point in the map. The digital elevation map may be used as is or may be rapidly processed into a digital surface/terrain model and used thereafter for robotic vehicle navigation and the like in known fashion.

Although the foregoing description relates to spatial data modelling, in particular to terrain modelling of a mine, it will be readily appreciated that the data modelling methodologies described herein are not limited to this application. Any modelling problem to which a Gaussian Process is applied may use the modified covariance function described herein, with fields including, and not limited to, weather forecasting, financial forecasting, bio-medical diagnosis, geometric modelling, stochastic maintenance modelling, astronomy, internet and search analysis, speech recognition, face recognition, audio/video data study, geophysics, mining, hydrology, reservoir engineering and robotics. As an example, the invention is also applicable to in-ground ore grade estimation, also in a mining context, where modelling of in-ground ore distributions are desired on the basis of drill hole analyses or other measurements. In the case of in-ground mineral distribution the data can have more dimensions than when considering surface elevation data.

In other applications, the input data to the process 510 can include multi-dimensional data points 410 of any dimensions and can represent a wide variety of parameters, including and not limited to time, distance, grade of material, temperature, humidity and density. These data points can be obtained in various ways, and need not be obtained by a sensor as such, as shown in 410.

Further details of the data modelling method and system are set forth below, with a particular focus on the details of the Gaussian process and underlying mathematical principles and procedures.

2. The Gaussian Process (GP)

Gaussian processes (GPs) provide a powerful learning framework for learning models of correlated and uncertain data. Gaussian process regression provides a robust means of estimation and interpolation of information that can handle incomplete sensor data effectively. GPs are non-parametric approaches in that they do not specify an explicit functional model between the input and output. They may be thought of as a Gaussian Probability Distribution in function space and are characterized by a mean function m(x) and the covariance function k(x, x') where $$m(x) = E[f(x)] \tag{1}$$

$$k(x,x') = E[(f(x)-m(x))(f(x'))] \tag{2}$$

such that the GP is written as $$f(x) \sim GP(m(x), k(x,x')) \tag{3}$$

The mean and covariance functions together provide a distribution over functions. In the context of modelling surface terrain, for example, each $x \equiv (x, y)$ and $f(x) \equiv z$ of the given data.

2.1 The Covariance Function in the Gaussian Process

The covariance function models the covariance between the random variables which, here, correspond to sensor measured data. Although not necessary, for the sake of convenience the mean function m(x) may be assumed to be zero by scaling the data appropriately such that it has a mean of zero. There are numerous covariance functions that can be used to model the spatial variation between the data points. It will be understood that a covariance function will be positive semi-definite and symmetric, that is k(x,y)=k(y,x). The most popular covariance function is the squared-exponential covariance function given as $$k_y(x_p, x_q) = \sigma_f^2 \exp\left(-\frac{1}{2l^2}(x_p - x_q)^2\right) + \sigma_n^2 \delta_{pq} \tag{4}$$

where $k_y$ is the covariance function; l is the characteristic length, a measure of how quickly the $f(x)$ value changes in relation to the x value; $\sigma_f^2$ is the signal variance and $\sigma_n^2$ is the noise variance in the data being modelled. The symbol $\delta_{pq}$ represents a Kroeneker Delta defined on indices p and q. The set of parameters l, $\sigma_f$, $\sigma_n$ are referred to as the hyperparameters and specify what sort of values the parameters might take.

Another covariance function, one that has been found to be successful in the present application, is the neural network covariance function. It is specified by $$k_y(x, x') = \sigma_f^2 \arcsin\left(\frac{\beta + 2x^T \Sigma x'}{\sqrt{(1 + \beta + 2x^T \Sigma x)(1 + \beta + 2x'^T \Sigma x')}}\right) + \sigma_n^2 \delta_{pq} \tag{5}$$

where $\Sigma$, $\sigma_f$, $\beta$ and $\sigma_n$ are the hyperparameters associated with the Gaussian process covariance function.

The difference between these two covariance functions is that the squared-exponential covariance function, being a function of |x−x'|, is stationary (invariant to translation) whereas the neural network covariance function is not so. In practice, the squared exponential covariance function has a smoothing or averaging effect on the data. The neural network covariance function proves to be much more effective than the squared exponential covariance function in handling discontinuous (rapidly changing) data.

Covariance functions in general and the covariance function described below can also be used in other kernel machines, for example support vector machines and kernel PCA (principal component analysis) machines. Kernel machines using the covariance function of the present invention may be used for machine learning or artificial intelligence techniques for data modelling applications including dimensionality reduction, classification problems, prediction/forecasting problems and regression analysis as described herein for spatial data.

Dimensionality reduction is used to reduce the number of data points that a data analysis uses and can be used for, for example, denoising, image compression or bio-informatics applications. Classification can be used, for example, for image recognition. Prediction methods can be used, for example, for forecasting in environmental sciences, e.g. for weather or pollution, for predicting failure times or rates of structures or devices, or for financial forecasting.

2.2 Training the Gaussian Process

Training the GP for a given dataset is tantamount to optimising the hyperparameters of the underlying covariance function. This training can be done using machine learning. It can also be done manually, for example by estimating the values and performing an iterative fitting process.

For a machine learning method, the hyperparameters are optimised with respect to the relevant covariance function. For the squared-exponential covariance function, this amounts to finding the optimal set of values for $\theta = \{l_x, l_y, l_z, \sigma_f, \sigma_n\}$. For the neural network covariance function, the optimal values must be determined for $\theta = \{l_x, l_y, l_z, \sigma_f, \beta, \sigma_n\}$.

This is done by formulating the problem in a Maximum Likelihood Estimation framework and subsequently solving a non-convex optimization problem.

A Bayesian procedure is used to maximise the log marginal likelihood of the training output (y) given the training input (X) for a set of hyperparameters θ which is given by $$\log(y \mid X, \theta) = -\frac{1}{2} y^T K_y^{-1} y - \frac{1}{2} \log|K_y| - \frac{n}{2} \log(2\pi) \quad (6)$$

where $K_y = K_f + \sigma_n^2 I$ is the covariance matrix for the noisy targets y. The log marginal likelihood has three terms—the first describes the data fit, the second term penalises model complexity and the last term is simply a normalisation coefficient. Thus, training the model will involve searching for the set of hyperparameters that enables the best data fit while avoiding overly complex models. Occam's razor is thus in-built in the system and prevention of over-fitting is guaranteed by the very formulation of the learning mechanism.

Using this maximum likelihood approach, training the GP model on a given set of data amounts to finding an optimal set of hyperparameters that maximize the log marginal likelihood (Eq. 6). This can be done using standard off-the-shelf optimization approaches. For example, a combination of stochastic search (simulated annealing) and gradient descent (Quasi-Newton optimization with BFGS Hessian update) has been found to be successful. Using a gradient based optimization approach leads to advantages in that convergence is achieved much faster. A description and further information about these optimization techniques and others can be found in the text *Numerical Optimization*, by J. Nocedal and S. Wright (Springer, 2006.

Applying the GP model amounts to using the learned GP model to estimate the elevation information across a region of interest, characterised by a grid of points at a desired resolution. The 2.5D elevation map can then be used as is or as a surface map for various applications. This is achieved by performing Gaussian Process Regression at the set of query points, given the training dataset and the GP covariance function with the learnt hyperparameters.

For additive independent identically distributed Gaussian noise with variance $\sigma_n^2$, the prior on the noisy observations becomes $$cov(y_p, y_q) = k(x_p, x_q) + \sigma_n^2 \delta_{pq} \quad (7)$$

where $\delta_{pq}$ is a Kroeneker Delta defined on p, q and is equal to 1 iff p=q and 0 otherwise.

The joint distribution of any finite number of random variables of a GP is Gaussian. Thus, the joint distribution of the training outputs $f$ and test outputs $f^*$ given this prior can be specified by $$\begin{bmatrix} y \\ f_* \end{bmatrix} \sim N \left( 0, \begin{bmatrix} K(X, X) + \sigma_n^2 I & K(X, X_*) \\ K(X_*, X) & K(X_*, X_*) \end{bmatrix} \right) \quad (8)$$

The function values ($f_*$) corresponding to the test inputs ($X_*$) given the training data X, training output y and covariance function K, is given by $$\bar{f}_* = K(X_*, X)[K(X,X) + \sigma_n^2 I]^{-1} y \quad (9)$$

and their uncertainty is given by $$cov(f_*) = K(X_*, X_*) - K(X_*, X)[K(X, X + \sigma_n^2 I)]^{-1} K(X, X_*) \quad (10)$$

Denoting K(X, X) by K and K(X, X$_*$) by K$_*$; for a single test point x$_*$, k(x$_*$)=k$_*$ is used to denote the vector of covariances between the test point and the set of all training points.

The above equations can then be rewritten for a single query point as:

$$\bar{\theta}_* = k_*^T (K + \sigma_n^2 I)^{-1} y \quad (11)$$

and $$V[f_*] = k(x_*, x_*) - k_*^T (K + \sigma_n^2 I)^{-1} k_* \quad (12)$$

Equations (11) and (12) provide the basis for the elevation estimation process. The GP estimates obtained are a best linear unbiased estimate for the respective query points. Uncertainty is handled by incorporating the sensor noise model in the training data. The representation produced is a multi-resolution one in that a terrain model can be generated at any desired resolution using the GP regression equations presented above. Thus, the terrain modelling approach proposed is a probabilistic, multi-resolution one that aptly handles spatially correlated information.

Although the Gaussian process modelling as described above is a powerful method, modelling large-scale stochastic processes still presents challenges. The difficulty comes from the fact that inference in GPs is usually computationally expensive due to the need to invert a potentially large covariance matrix during inference time which has $O(N^3)$ cost. For problems with thousands of observations, exact inference in normal GPs is intractable and approximation algorithms are required.

Most of the approximation algorithms employ a subset of points to approximate the posterior distribution of a new point given the training data and hyperparameters. These approximations rely on heuristics to select the subset of points, or use pseudo targets obtained during the optimization of the log-marginal likelihood of the model.

3. The New Covariance Function

It is also possible to address the complexity problem differently. Instead of relying on sparse GP approximations, a new covariance function may be employed which provides intrinsically sparse covariance matrices. This allows exact inference in sparse GPs using conventional methods. The new sparse covariance function can be multiplied by any other covariance function and the result is a sparse covariance matrix, enabling a high degree of flexibility to accurately model problems while still preserving the sparseness properties. Gaussian processes constructed using this new sparse covariance function are referred to herein as Exact Sparse Gaussian Processes (ESGPs).

The ESGP utilizes a smooth covariance function whose output equals zero whenever the distance between input observations is larger than a hyperparameter. It will be understood that smooth means continuously differentiable at least once. As with other hyperparameters, this can be estimated by maximising the marginal likelihood to better model the properties of the data such as smoothness, characteristic length, and noise. The new covariance function resembles the popular squared exponential in terms of smoothness. The ESGP compares well with local approximation techniques and can be used together with other (non-stationary) covariance functions in the same modelling framework. The method results in very sparse covariance matrices (over 90% equal to zero in an in-ground grade estimation example presented below) which requires significantly less memory while providing better performance.

The covariance function sought must vanish out of some finite interval to enable exact sparse GP regression. It must preferably produce smooth sample curves but the sample curves should not be infinitely differentiable so that they will be applicable to inference of processes that have jumps in some derivatives.

The function $f(x)=\cos^2(\pi x)H(0.5-|x|)$ has been chosen as a basis function.

In view of $\cos^2(\pi x)=(\cos(2\pi x)+1)/2$, the basis function is actually the cosine function shifted up, normalized and set to zero out of the interval $x \in (-0.5, 0.5)$. The cosine function was chosen as a basis function because it is analytically well tractable, integrals with finite limits containing its combinations, can be calculated in closed form and also the cosine function has proved to be able to provide good approximations for different functions and is a core element of the Fourier analysis. Here and afterwards H(.) represents the Heaviside unit step function. The chosen basis function $f(x)$ is smooth on the whole real axis, vanishes out of the interval $x \in (-0.5, 0.5)$ and has discontinuities in the second derivative.

Using the transfer function $h(x; u)=f(x-u)$ the following 1D covariance function can be obtained:

$$K_1(x, x') = \sigma \int_{-\infty}^{\infty} h\left(\frac{x}{l}; u\right) h\left(\frac{x'}{l}; u\right) du \quad (13)$$

Due to the chosen form of the basis function the integral in Eq. (13) can be analytically evaluated to result in:

$$K_1(x, x'; l, \sigma_0) = \begin{cases} \sigma_0 \left[ \frac{2+\cos\left(2\pi \frac{d}{l}\right)}{3}\left(1-\frac{d}{l}\right) + \frac{1}{2\pi}\sin\left(2\pi\frac{d}{l}\right) \right] & \text{if } d < l \\ 0 & \text{if } d \geq l \end{cases} \quad (14)$$

where $\sigma_0>0$ is a constant coefficient, $l>0$ is a characteristic length and d is the distance between the points:

$$d=|x-x'| \quad (15)$$

From Eq. (14) it follows that for any points $x_i$ and any numbers $a_i$ where i=1, 2, ..., n the inequality $$\sum_{i,j=1}^{n} a_i a_j K_1(x_i, x_j) = \sigma \int_{-\infty}^{\infty} \left(\sum_{i=1}^{n} a_i h\left(\frac{x_i}{l}; u\right)\right)^2 du \geq 0 \text{ holds,}$$

so that the constructed covariance function is positive semi-definite.

Figure 6:
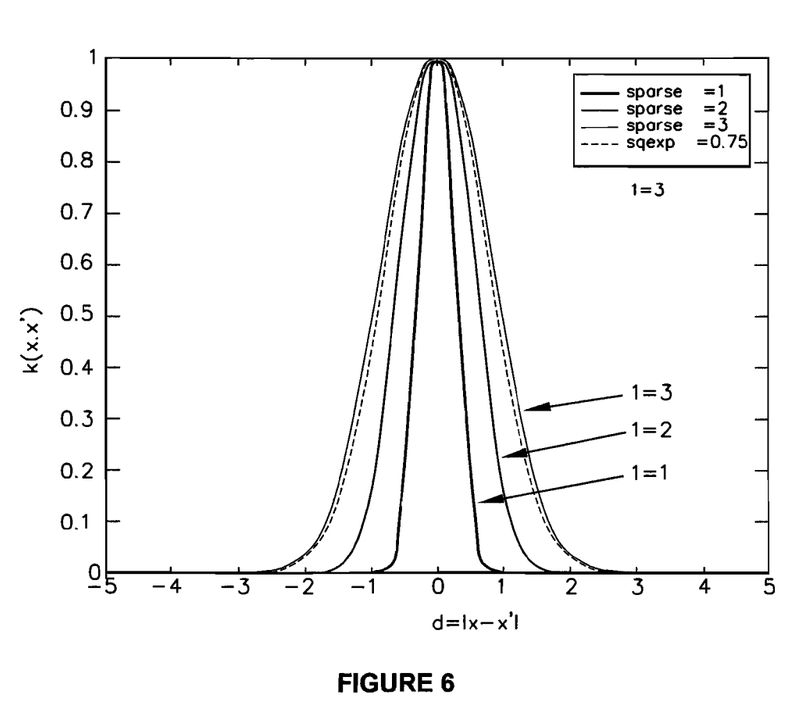
FIG. 6 is a plot of the covariance function for an exactly sparse Gaussian process for various values of hyperparameter l.

Based on Eqs. (14)-(15) it can be calculated that $$K|_{d=l} = \frac{\partial K}{\partial d}\bigg|_{d=l} = \frac{\partial^2 K}{\partial d^2}\bigg|_{d=l} = \frac{\partial^3 K}{\partial d^3}\bigg|_{d=l} = \frac{\partial^4 K}{\partial d^4}\bigg|_{d=l} = 0 \quad (16)$$

$$\frac{\partial^5 K}{\partial d^5}\bigg|_{d=l} = -4\pi^4 \neq 0 \quad (17)$$

which shows that the covariance function $K_1$ is continuous and has continuous $4^{th}$ derivative. The function $K_1(d,0;1,1)$ is illustrated in FIG. 6.

This covariance function can be extended to multiple dimensions in the following ways:
1. Using direct products for all axes:

$$K_M^{(1)}(x, x'; L, \sigma_o) = \sigma_o \prod_{i=1}^{D} K_1(x_i, x'_i; l_i, 1) \quad (18)$$

where D is the dimensionality of the points;

$$x=(x_1,x_2,\ldots,x_D)^T, x'=(x'_1,x'_2,\ldots,x'_D)^T \quad (19)$$

are the points and their coordinates; and L is the vector of the characteristic lengths:

$$L=(l_1,l_2,\ldots,l_D)^T \quad (20)$$

2. Using Mahalanobis distance:

$$K_M^{(2)}(r; \sigma_o, \Omega) = \sigma_o \left[ \frac{2+\cos(2\pi r)}{3}(1-r) + \frac{1}{2\pi}\sin(2\pi r) \right] \text{ if } r < l \quad (21)$$

$$K_M^{(2)}(r; \sigma_o, \Omega) = \text{ if } r \geq l \quad (22)$$

where $\sigma_0>0$, $\Omega$ is positive definite and $$i=\sqrt{(x-x')^T \Omega (x-x')}, \Omega>0 \quad (23)$$

$K_M$ is used in this specification to refer to the function $K_M^{(2)}(r;\sigma_0\Omega)$.

The developed new multi-dimensional covariance function in both its forms $K_M^{(1)}$ and $K_M^{(2)}$ has the following remarkable properties:
1. It vanishes out of some finite region S:

$$S_2=\{r \in \mathfrak{R}^D : K_M^{(2)}(r) \neq 0\} \quad (24)$$

$$S_2=\{r \in \mathfrak{R}^D : K_M^{(2)}(r) \neq 0\} \quad (25)$$

Sizes of the regions $S_1$ and $S_2$ can be controlled via the characteristic lengths $l_i$. Moreover, these sizes can be learned from the data using GPs.
2. All the derivatives up to (and including) the fourth order derivative vanish at the perimeter of S, which guarantees mean square differentiability up to the corresponding order of the sample curves in GPs. There is a discontinuity at the perimeter for the fifth order gradient.
3. The region $S_1$ is a D dimensional rectangle and the region $S_2$ is a D dimensional ellipsoid.
4. In the case of one dimension $K_M^{(1)}$ and $K_M^{(2)}$ become identical.
5. This covariance function makes it possible to learn the anisotropic properties of the data (i.e. different inner properties in different directions).
6. This covariance function leads to very sparse covariance matrices and makes it possible to study the whole picture of huge datasets with low memory and computational cost requirements and without making local approximations.

Based on Eqs. (14)-(20) the following expressions for the partial derivatives of $K_M^{(1)}(x,x';L,\sigma_0)$ can be calculated:

$$\frac{\partial K_M^{(1)}}{\partial \sigma_0} = \frac{1}{\sigma_0} K_M^{(1)} \quad (26)$$

-continued $$\frac{\partial K_M^{(1)}}{\partial l_i} = \frac{4\sigma_0}{3} \frac{K_M^{(1)}}{K_i} \frac{d_i}{l_i^2} \left[ \pi \left(1 - \frac{d_i}{l_i}\right) \cos\left(\pi \frac{d_i}{l_i}\right) + \sin\left(\pi \frac{d_i}{l_i}\right) \right] \sin\left(\pi \frac{d_i}{l_i}\right) \quad (27)$$

where i=1, 2, ..., D.

If $\Omega$ is diagonal and positive definite it can be expressed via the characteristic lengths as follows:

$$\Omega = \text{diag}\left(\frac{1}{l_1^2}, \frac{1}{l_2^2}, \ldots, \frac{1}{l_D^2}\right) \quad (28)$$

From Eqs. (23)-(28) it follows that $$r = \sqrt{\sum_{k=1}^{D} \left(\frac{x_k - x_k'}{l_k}\right)^2} \quad (29)$$

Based on Eqs. (21)-(23), (28)-(29) the following gradient components of this multi-dimensional covariance function $K_M$ can be obtained:

$$\frac{\partial K_M}{\partial \sigma_0} = \frac{2 + \cos(2\pi r)}{3}(1-r) + \frac{1}{2\pi}\sin(2\pi r), \text{ if } 0 \le r < 1 \quad (30)$$

$$\frac{\partial K_M}{\partial l_j} = \frac{4\sigma_0}{3}[\pi(1-r)\cos(\pi r) + \sin(\pi r)]\frac{\sin(\pi r)}{r}\frac{1}{l_j}\left(\frac{x_j - x_j'}{l_j}\right)^2, \quad (31)$$
if $0 < r < 1$ $$\text{grad} K_M = 0, \text{ if } r \ge 1 \quad (32)$$

In Eq. (31) there is r in the denominator, so that direct calculations cannot be carried out using Eq. (31) when r=0. However, using the equality $$\lim_{r \to 0} \frac{\sin(\mu r)}{r} = \mu \quad (33)$$

one can directly show that $$\lim_{r \to 0} \frac{\partial K_M}{\partial l_j}(r; \sigma_0, \Omega) = \lim_{r \to 0} \frac{4\sigma_0}{3}\pi^2 \frac{1}{l_j}\left(\frac{x_j - x_j'}{l_j}\right)^2 = 0 \quad (34)$$

Based on Eq. (34) it must be taken directly $$\left.\frac{\partial K_M}{\partial l_j}\right|_{r=0} = 0, j = 1, 2, \ldots, D \quad (35)$$

Equations (30)-(32), (35) fully define the gradient of the new covariance function $K_M$ at every point and can be directly used in calculations.

4. Advantages Over the Neural Network Covariance Function

Figure 7:
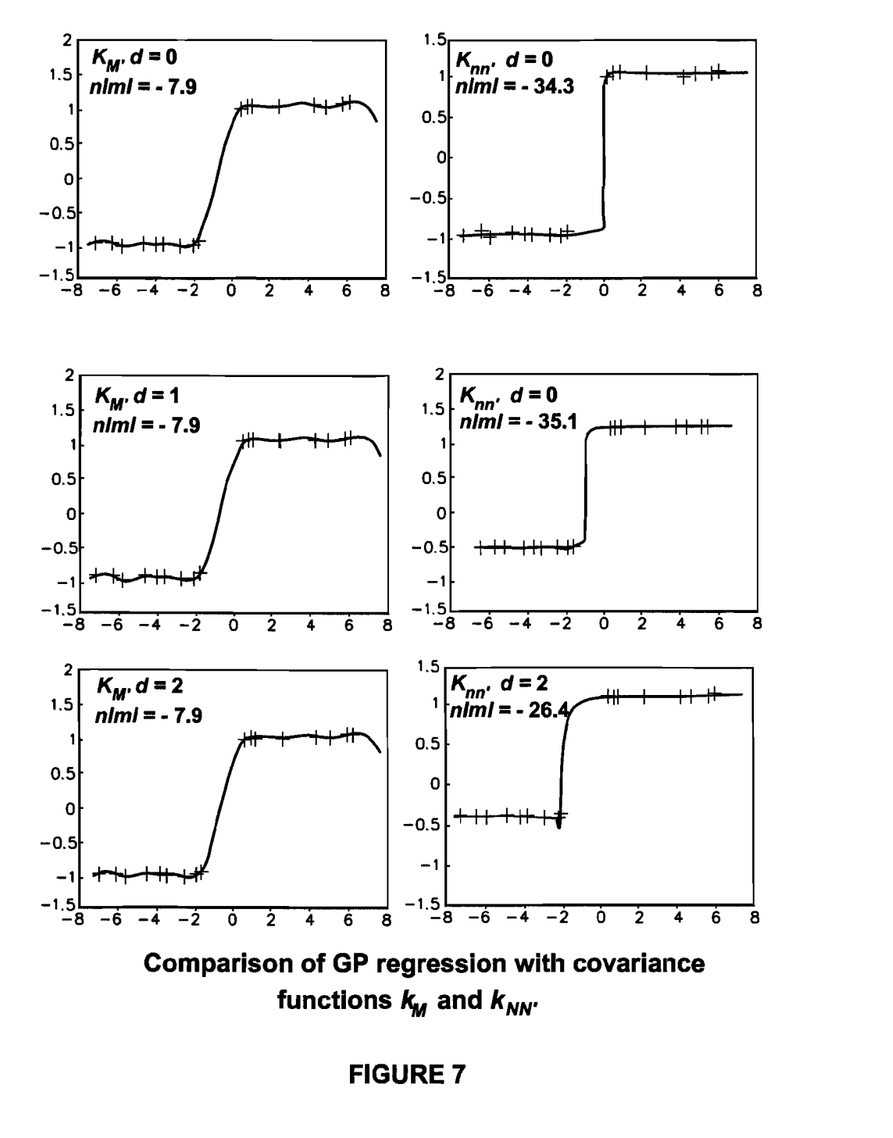
FIGS. 7 and 8 show a comparison between the outputs of a Gaussian process model utilising a neural network covariance function $K_{NN}$ and the new covariance function $K_M$ that results in an exactly sparse Gaussian process.
Figure 8:
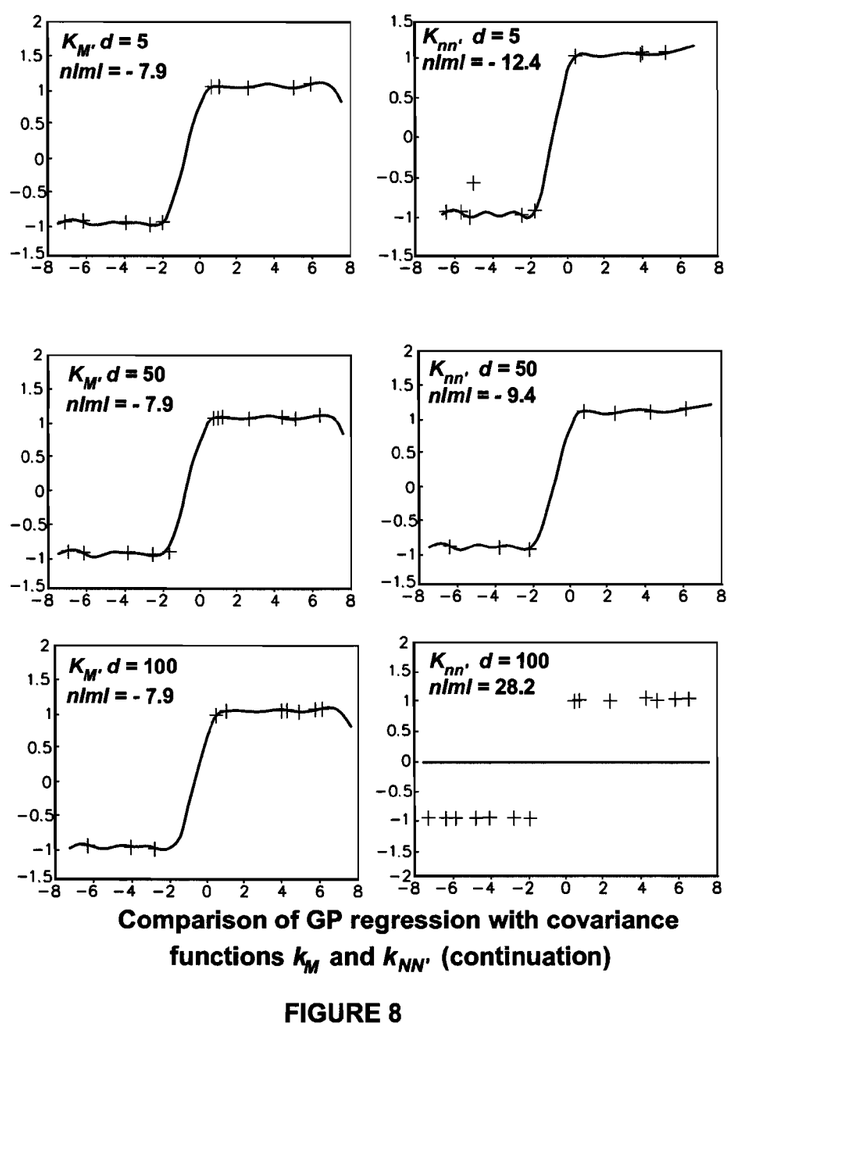

As described above, the neural network (NN) covariance function is known for its ability to model discontinuities without undesired oscillations. However, numerical computations and comparisons shown in FIGS. 7 and 8 demonstrate that $K_M$ provides much better results and is independent of axes translations. In these figures the neural network covariance function $K_{NN}$ and the covariance function $K_M$ were each used to model a set of data points and the results are shown side-by-side. As can be seen in the plots of the actual data points and resulting fitted curves, in each instance the sparse covariance function results in a curve that more closely follows the actual data then the neural network covariance function. For example, in FIG. 7 the curves fitted to the data as a result of the $K_{NN}$ covariance function can be seen to vary with axis translations, whilst $K_M$ does not. In FIG. 7, $K_M$ provides reliable results in each case, whereas $K_{NN}$ is unable to fit a curve to the data points in the last instance. Furthermore, $K_M$ is more reliable, has better performance, requires much less memory usage and has much less computational cost than the neural network covariance function.

Application of this new covariance function to an in-ground ore grade estimation problem has shown that a covariance matrix which has about 2 million cells has over 90% of its cells exactly equal to 0. This provides possibilities for significantly decreasing the memory and computational costs of the computations. Using $K_M$ the number of zero cells is $O(n^2)$ while the number of nonzero cells is $O(n)$. Consequently, the percentage of zeros in the covariance matrix will significantly grow for bigger datasets. It can become over 95%, over 99% and even greater as the dataset becomes bigger and bigger.

Figure 9:
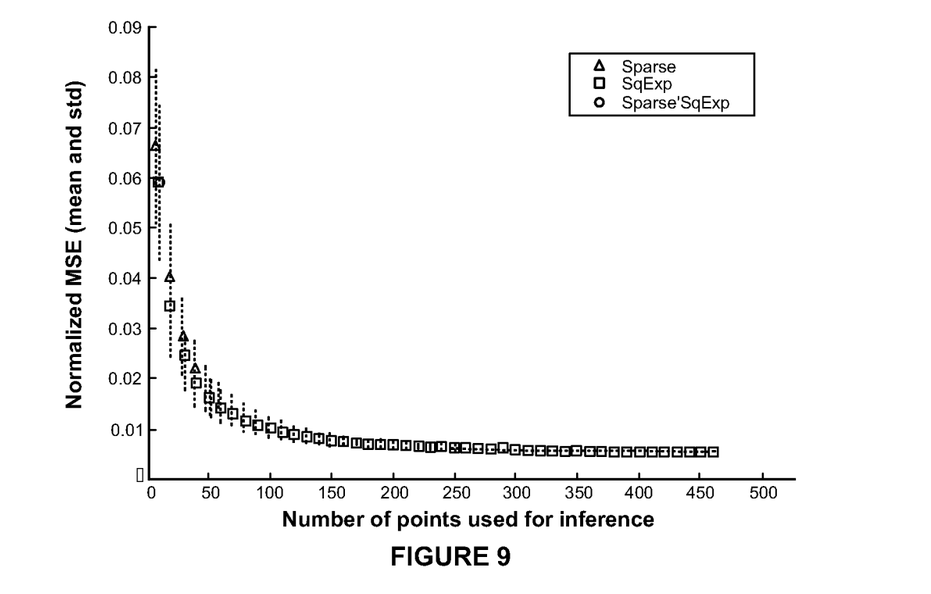
FIG. 9 shows a normalized squared error for different covariance functions and the standard deviation as a function of the number of inference points.
Figure 10:
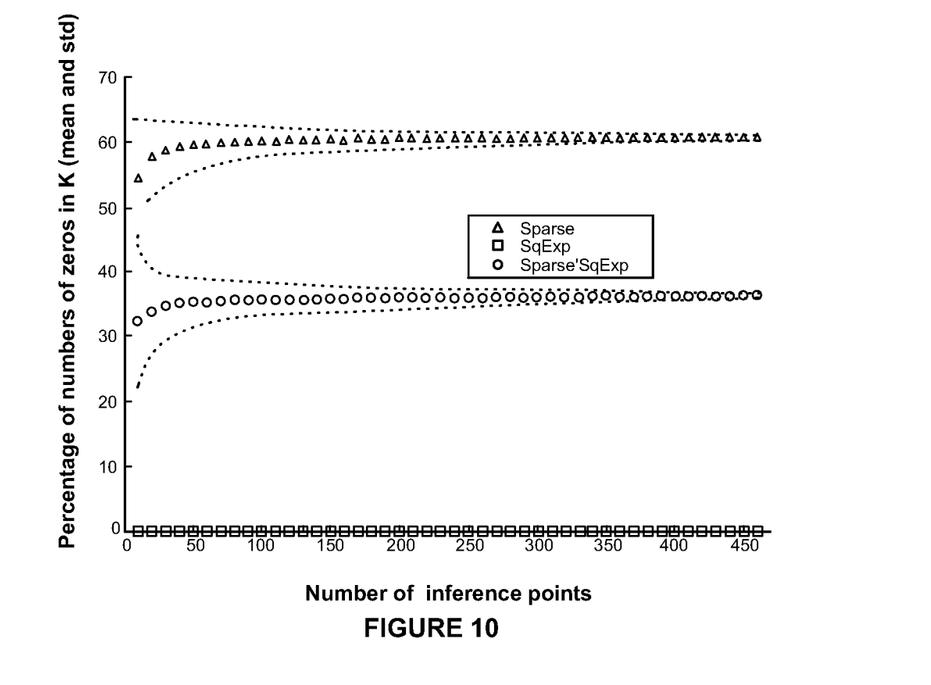
FIG. 10 shows the percentage of zeros in the covariance matrix as a function of the number of inference points.

To demonstrate the benefits of the proposed approach in reducing storage and number of operations for the same accuracy, the exact sparse GP can be compared with the exact GP with the squared exponential covariance function and the covariance function obtained by the multiplication of both of them. The dataset used for this example is a popular dataset in statistics for comparing inference procedures and is known as the Spatial Interpolation Comparison dataset (SIC). The dataset consists of 467 points measuring daily rainfall measurements in 2D geographical space. These points are divided into two sets, inference and testing. The inference set contains the points used to perform inference on the testing points. For each case the experiment is repeated 1500 times with randomly selected inference and testing sets. FIG. 9 shows the normalized squared error for the different covariance functions and the standard deviation (one sigma for each part of the bar) as a function of the number of inference points. As the number of inference points increases, so does the size of the covariance matrix. The results demonstrate that very similar errors are obtained for the difference covariances. However, the sparse covariance function produces sparse matrices thus requiring much less floating point operations. FIG. 10 shows the percentage of zeros in the covariance matrix as a function of the number of inference points. As can be observed, the percentage of zeros grows quickly as more inference points are added and it reaches its limit around 100 inference points. Although the percentage of zeros reaches its limit, the number of zeros in the covariance matrix still increases because the size of the covariance matrix increases with the number of inference points. Also worth noticing is the performance of the multiplication between the two covariance functions. The error is essentially the same as for the sparse covariance function alone but the percentage of zeros for the sparse covariance function is significantly greater than for the product.

The foregoing description shows that large scale data modelling using Gaussian process techniques can be substantially improved in terms of both modelling accuracy and required computational effort by employing a sparse covariance function in isolation or in combination with another stationary or non-stationary covariance function (e.g. the non-stationary neural-network covariance function). The Exact Sparse Gaussian Process is successfully able to model large complex datasets whilst requiring significantly less memory and computational effort as compared to known GP applications.

The foregoing detailed description of the present invention has been presented by way of example only and is not intended to limit the scope of the invention which includes each and every novel feature and combination of novel features herein disclosed.

The invention claimed is:

1. A computer-implemented method for modelling data using a Gaussian process comprising:
obtaining data to be modelled;
using the computer to model the obtained data by determining hyperparameters of a sparse covariance function for the Gaussian process, the hyperparameters including a characteristic length determined from the data; and
using the computer to define the sparse covariance function for the Gaussian process that diminishes to zero outside of the characteristic length;
wherein the sparse covariance function results in a covariance matrix with a sparseness that depends on the determined characteristic length.

2. The method of claim 1, wherein the sparse covariance function is smooth.

3. The method of claim 1, wherein the sparse covariance function has a continuous fourth derivative.

4. The method of claim 1, further comprising determining the characteristic length through a machine learning process.

5. The method of claim 1, wherein the sparse covariance function is multi-dimensional with a separate characteristic length for each dimension.

6. The method of claim 1, further comprising combining a non-stationary covariance function with the sparse covariance function for the Gaussian process.

7. The method of claim 6, wherein the non-stationary covariance function is a neural network covariance function.

8. The method of claim 1, wherein the data is measured using one or more measurement sensors.

9. The method as claimed in claim 8, wherein the data represents geographical surface terrain.

10. The method of claim 8, wherein the data represents in-ground geological mineral distribution.

11. A computer-implemented method for modelling large scale data representing a distribution of physical properties, comprising
obtaining a measured dataset,
using the computer to apply an exactly sparse Gaussian process covariance function to the measured dataset to determine an optimized set of hyperparameter values associated with the Gaussian process covariance function, which optimized set of hyperparameter values includes a characteristic length, the exactly sparse Gaussian process covariance function diminishing to zero outside of the characteristic length, and
using the computer to generate selected model data by Gaussian process regression using the optimized hyperparameter set and the measured dataset,
wherein the exactly sparse Gaussian process covariance function results in a covariance matrix with a sparseness that depends on the characteristic length.

12. The method as claimed in claim 11, wherein the exactly sparse Gaussian process covariance function comprises a sparse covariance function that is smooth and diminishes to zero outside of the characteristic length hyperparameter, and a non-stationary neural network covariance function.

13. The method as claimed in claim 11, wherein the exactly sparse Gaussian process covariance function is multi-dimensional with a separate characteristic length hyperparameter for each dimension.

14. The method as claimed in claim 11, wherein the measured dataset represents geographical surface terrain measurements.

15. The method as claimed in claim 11, wherein the measured dataset represents in-ground geological mineral distribution measurements.

16. A system for large scale data modelling, comprising:
at least one data measurement sensor for generating measured data representing a distribution of physical properties in a selected geographical region;
a training processor adapted to determine for the measured data optimized hyperparameter values in relation to a Gaussian process covariance function comprising a sparse covariance function that is smooth and diminishes to zero outside of a characteristic length, wherein the characteristic length is determined from the measured data and wherein the sparse covariance function results in a covariance matrix with a sparseness that depends on the determined characteristic length; and
an evaluation processor adapted to determine model data from the Gaussian process covariance function with optimised hyperparameter values and the measured data.

17. The system as claimed in claim 16, wherein the Gaussian process covariance function also comprises a non-stationary neural network covariance function.

18. The system as claimed in claim 16, wherein the measured data comprises geographical surface terrain measurements.

19. The system as claimed in claim 16, wherein the measured data comprises in-ground ore grade distribution measurements.

20. A computational method for modelling a data space, the method comprising:
using a computational system, applying to the data space a kernel machine, wherein the kernel machine uses a sparse covariance function which is constructed from a smooth basis function equal to zero outside of a characteristic length hyperparameter determined from the data space, wherein the sparse covariance function results in a covariance matrix with a sparseness that depends on the characteristic length hyperparameter; and
one of outputting and storing in memory a model from the kernel machine.

21. The method of claim 20 wherein the kernel machine uses a Gaussian learning process.

22. The method of claim 20, wherein the basis function is a squared cosine wave.

23. The method of claim 20, wherein the basis function is $\cos^2(\pi x)H(0.5-|x|)$ where $H(.)$ is a step function.

24. The method of claim 20, wherein the data space is multi-dimensional having N dimensions with the sparse covariance function $$K_1(x, x'; l, \sigma_0) = \begin{cases} \sigma_0 \left[ \dfrac{2 + \cos\left(2\pi \dfrac{d}{l}\right)}{3}\left(1 - \dfrac{d}{l}\right) + \dfrac{1}{2\pi}\sin\left(2\pi \dfrac{d}{l}\right) \right] & \text{if } d < l \\ 0 & \text{if } d \geq l \end{cases}, d = |x - x'|$$

extended to multiple dimensions.

25. A computational method for modelling a data space, the method comprising:

using a computational system, applying to the data space a kernel machine, wherein the kernel of the kernel machine is a positive semi-definite function and a symmetric function, equal to zero outside of a characteristic length hyperparameter determined from the data space, and wherein the kernel results in a covariance matrix with a sparseness that depends on the determined characteristic length hyperparameter; and at least one of outputting and storing in memory a model from the kernel machine.

\* \* \* \* \*